(12) United States Patent
Nair

(10) Patent No.: US 9,984,017 B2
(45) Date of Patent: May 29, 2018

(54) INTELLIGENT NETWORK FABRIC TO CONNECT MULTIPLE COMPUTER NODES WITH ONE OR MORE SR-IOV DEVICES

(71) Applicant: Intel Corporation, Santa Clara, CA (US)

(72) Inventor: Mohan K. Nair, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 14/583,682

(22) Filed: Dec. 27, 2014

(65) Prior Publication Data

US 2016/0188513 A1    Jun. 30, 2016

(51) Int. Cl.
| | | |
|---|---|---|
| *G06F 13/36* | (2006.01) | |
| *G06F 13/366* | (2006.01) | |
| *G06F 13/40* | (2006.01) | |
| *G06F 13/42* | (2006.01) | |

(52) U.S. Cl.
CPC ........ *G06F 13/366* (2013.01); *G06F 13/4068* (2013.01); *G06F 13/4282* (2013.01)

(58) Field of Classification Search
CPC ......... G06F 13/40; G06F 13/42; G06F 13/366
See application file for complete search history.

(56) References Cited

U.S. PATENT DOCUMENTS

| | | | | |
|---|---|---|---|---|
| 8,503,468 B2* | 8/2013 | Akyol | .................. | G06F 13/385 370/389 |
| 8,537,820 B2* | 9/2013 | Klinglesmith | ...... | H04L 12/6418 370/390 |
| 9,215,087 B2* | 12/2015 | Flynn | .................... | H04L 45/566 |
| 9,563,591 B2* | 2/2017 | McGlone | ........... | G06F 13/4022 |
| 9,684,530 B2* | 6/2017 | Ho | ...................... | G06F 9/45558 |
| 9,684,618 B2* | 6/2017 | McGlone | ........... | G06F 13/4022 |
| 9,792,240 B2* | 10/2017 | Jose | .................... | G06F 13/4022 |
| 2008/0147943 A1* | 6/2008 | Freimuth | ........... | G06F 13/4282 710/240 |
| 2008/0244146 A1* | 10/2008 | Das | .................... | G06F 11/0745 710/309 |
| 2009/0235008 A1* | 9/2009 | Deshpande | .......... | G06F 13/385 710/310 |

(Continued)

OTHER PUBLICATIONS

Zhang, Yue et al., A Scheduling Algorithm for Maintaining Packet Order in Fully Buffered Multistage Switching Fabric, 2009 ISECS International Colloquium on Computing, Communication, Control, and Management, pp. 132-135.

(Continued)

*Primary Examiner* — Henry Tsai
*Assistant Examiner* — Christopher A Daley
(74) *Attorney, Agent, or Firm* — Schwabe, Williamson & Wyatt, P.C.

(57) ABSTRACT

This disclosure pertains to an intelligent network fabric used to connect multiple computer nodes with one or more SR-IOV devices. The intelligent fabric includes a management device and a network fabric coupled thereto. A plurality of virtual endpoint devices are coupled to the network fabric and are configured to connect with a plurality of compute nodes. In addition, the intelligent network fabric includes a root port device coupled to the network fabric which the root port is configured to connect with virtual functions within a SR-IOV device.

31 Claims, 9 Drawing Sheets

(56) References Cited

U.S. PATENT DOCUMENTS

| | | | | |
|---|---|---|---|---|
| 2012/0284712 | A1* | 11/2012 | Nimmagadda | G06F 9/5077 |
| | | | | 718/1 |
| 2013/0054845 | A1* | 2/2013 | Nimmala | G06F 13/4022 |
| | | | | 710/36 |
| 2013/0160002 | A1* | 6/2013 | Graham | G06F 9/45558 |
| | | | | 718/1 |
| 2014/0164657 | A1* | 6/2014 | Chandrasekhar | G06F 9/45558 |
| | | | | 710/104 |
| 2014/0237156 | A1* | 8/2014 | Regula | G06F 21/85 |
| | | | | 710/314 |
| 2015/0052282 | A1* | 2/2015 | Dong | G06F 13/32 |
| | | | | 710/308 |
| 2015/0381527 | A1* | 12/2015 | Banzhaf | G06F 9/45558 |
| | | | | 709/226 |
| 2016/0179579 | A1* | 6/2016 | Amann | G06F 9/45558 |
| | | | | 718/104 |
| 2017/0078216 | A1* | 3/2017 | Adolph | H04L 12/4641 |

OTHER PUBLICATIONS

FSC TEC-Team, Bernhard Schräder, Powerpoint presentation, Multi Root I/O Virtualization . . . and its Potential to consolidate I/O Infrastructures, 9 pages, Paderborn, Nov. 2, 2008, Fujitsu Siemens Computers 2008.

PCIe Sharing: Avoiding Adapter Captivity, Copyright 2011, Virtensys, 7 pages.

Ajoy Aswadhati, Director, System Products PLX Technology, Scaling Data Center Interconnects with PCI Express®, PCI-SIG Developers Conference, 2011, PCI-SIG, 35 pages.

PCI Express Peer-to-Peer Interconnect, PCIe as a backplane fabric: The system architecture implications, GE Intelligent Platforms, 2011, 10 pages.

Kwong, Kwok, Using Pci Express® As the Primary System Interconnect in Multiroot Compute, Storage, Communications and Embedded Systems, 12 pages, 2008.

* cited by examiner ent with the present disclosure.
INTELLIGENT NETWORK FABRIC TO CONNECT MULTIPLE COMPUTER NODES WITH ONE OR MORE SR-IOV DEVICES

FIELD

This disclosure pertains to an intelligent network fabric used to connect multiple computer nodes with one or more SR-IOV devices.

BRIEF DESCRIPTION OF THE DRAWINGS

To facilitate understanding, identical reference numerals have been used, where possible, to designate identical elements that are common to the drawings. The drawings are not to scale and the relative dimensions of various elements in the drawings are depicted schematically and not necessarily to scale. The techniques of the present disclosure may readily be understood by considering the following detailed description in conjunction with the accompanying drawings, in which.

DETAILED DESCRIPTION

Figure 1:
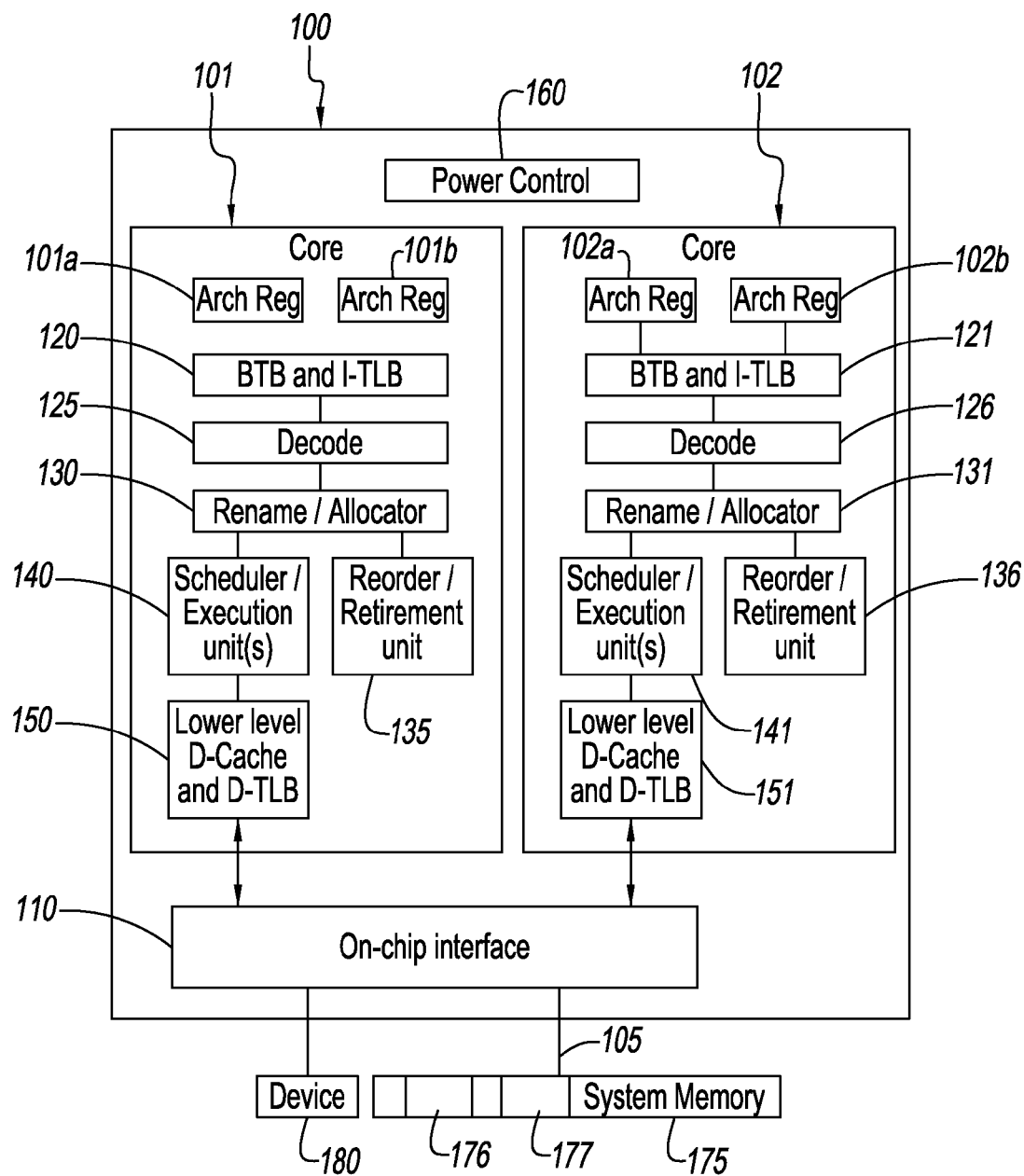
FIG. 1 is a schematic diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement units 135, 136, ILTB 120, load/store buffers, and queues may be shared through partitioning. Other resources, such as general purpose internal registers, page-table base register(s), low-level data-cache and data-TLB 115, execution unit(s) 140, 141, and portions of out-of-order unit 135, 136 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer blocks 130, 131 include an allocator to reserve resources, such as register files to store instruction processing results. However, threads 101a and 101b are potentially capable of out-of-order execution, where allocator and renamer blocks 130, 131 also reserve other resources, such as reorder buffers to track instruction results. Units 130, 131 may also include a register renamer to rename program/instruction reference registers to other registers internal to processor 100. Reorder/retirement units 135, 136 include components, such as the reorder buffers mentioned above, load buffers, and store buffers, to support out-of-order execution and later in-order retirement of instructions executed out-of-order.

Scheduler and execution unit(s) blocks 140, 141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 150, 151z are coupled to execution unit(s) 140, 141. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
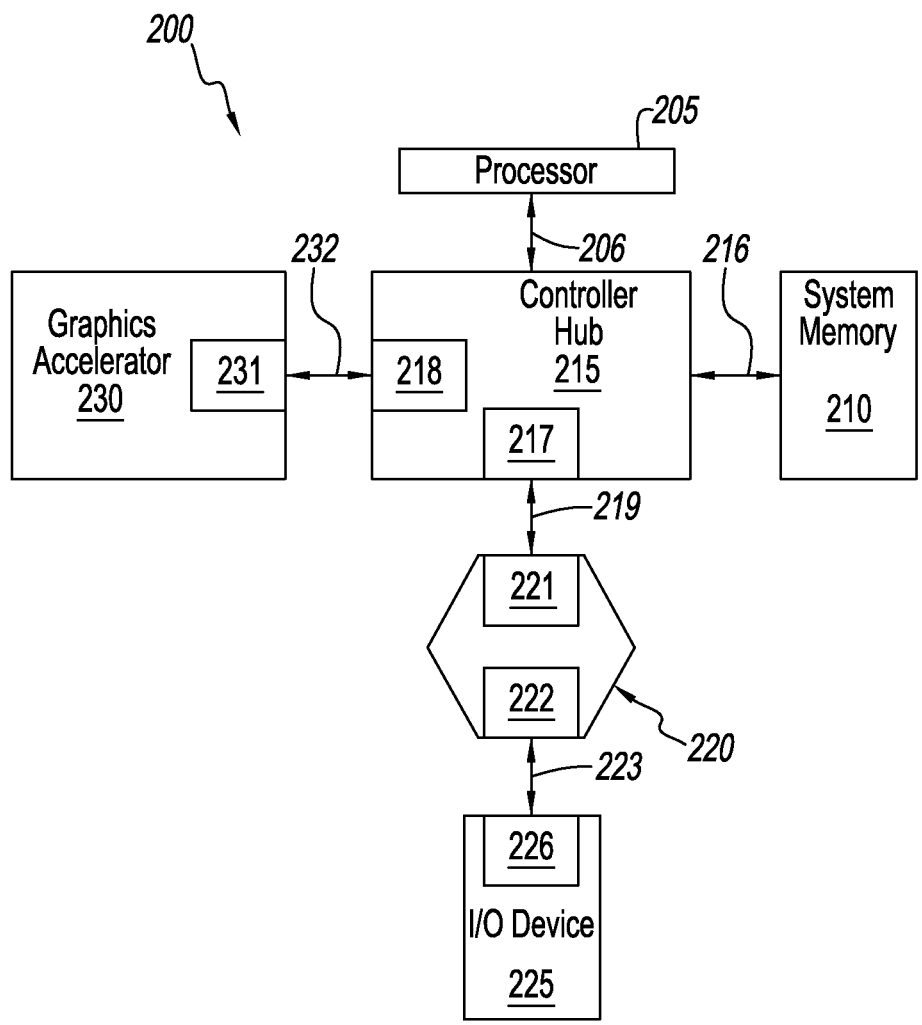
FIG. 2 is a schematic diagram illustrating an embodiment of a computing system including a peripheral component interconnect express (PCIe) compliant architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In one embodiment, peer-to-peer routing is optionally supported through the root complex device.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225 (i.e. interface ports 22, 226 through serial link 223). Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
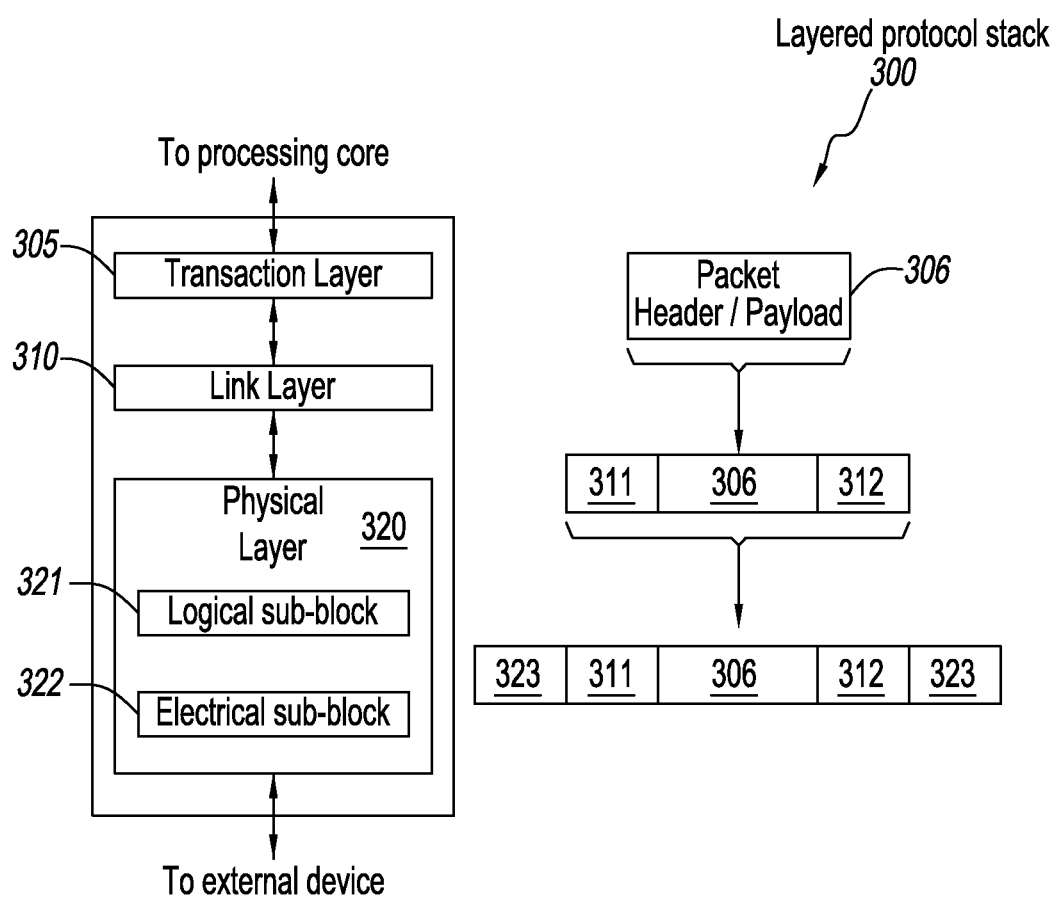
FIG. 3 is a schematic diagram illustrating an embodiment of a PCIe compliant interconnect architecture including a layered stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that may be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The transaction layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, which counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
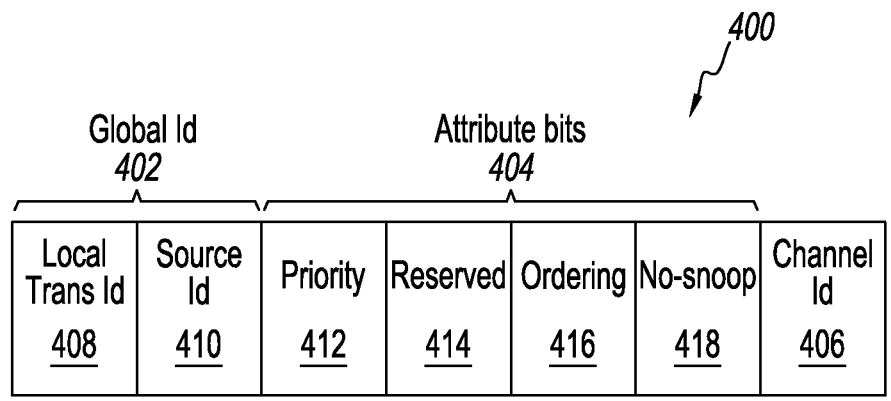
FIG. 4 is a schematic diagram illustrating an embodiment of a PCIe compliant request or packet to be generated or received within an interconnect architecture.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 418 is utilized to determine if transactions are snooped. As shown, channel ID Field 406 identifies a channel that a transaction is associated with.

Link Layer (Refer to FIG. 3)

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for platform and silicon variations.

PCIe Generation 3 (PCIe Gen3) is an example of an industry standard that has equalization on a per transmitter-receiver pair basis to ensure interoperability at 8 GT/s for the wide range of systems that deploy PCIe. However, the wide variety of devices, manufactured by different vendors, with different process technologies, each with their proprietary transmitter/receiver design, and proprietary hardware algorithms to adapt makes it a challenge to design components with guaranteed interoperability.

Figure 5:
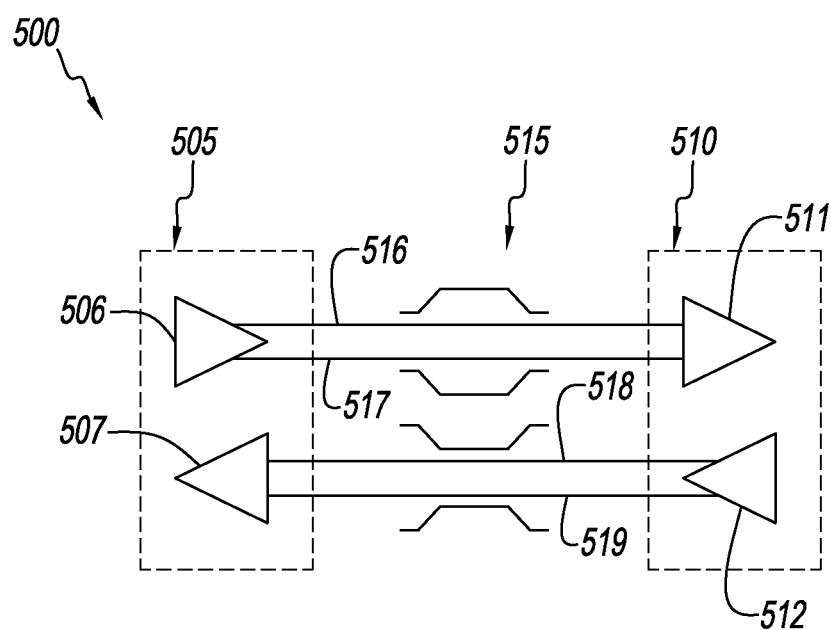
FIG. 5 is a schematic diagram illustrating an embodiment of a serial point-to-point interconnect.

Referring next to FIG. 5, an embodiment of a PCIe serial point-to-point interconnect is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e., paths 516 and 517, and two receiving paths, i.e., paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 515. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e., a rising edge, line 517 drives from a high logic level to a low logic level, i.e., a falling edge. Differential signals potentially demonstrate better electrical characteristics, such as better signal integrity, i.e., cross-coupling, voltage overshoot/undershoot, ringing, etcetera. This allows for better timing window, which enables faster transmission frequencies. As the electronics industry is moving towards greater integration such that all system components are integrated into a SoC, focus has shifted to define various technologies and network topologies to interconnect the SoC's for scalable multi-node, multi-cluster, multi-node (collectively referred to as "multi-node" hereafter) system architecture that provides low power and cost targets in addition to providing high-level reliability, availability, and serviceability (RAS). Furthermore, as electronic systems move from single-node to multi-node topologies, it is not cost effective to provide a single node dedicated resource for each node and therefore the ability to share IO resources within multi-node topologies is needed.

The standard PCIe topology allows point-to-point connectivity with one root complex in a PCIe tree. The PCIe specification defines various extensions to support sharing resources. For example, a single-root I/O virtualization (SR-IOV) extension enables multiple virtualized machines (e.g., system images) to share PCIe hardware resources under a single-node system (i.e., single root complex). A SR-IOV device provides a unique bus device function (BDF) identifier for each virtual function within a PCIe hierarchy; a unique memory address space for each virtual function within a PCIe hierarchy; a unique error logging and escalation scheme; a unique MSI/MSI-X capability for each virtual function (VF) within a PCIe hierarch; and unique power-management capabilities for each virtual function within a PCIe hierarchy. In addition, the SR-IOV device provides the capability to discover and configure virtualization capabilities which include the number of virtual functions that the PCIe device will associate with a PF and the type of base address register (BAR) mechanism supported by the virtual functions. Moreover, the present disclosure may utilize existing SR-IOV devices without requiring any modification thereto. The present disclosure provides a novel method to extend sharing of a standard PCIe SR-IOV device among multiple nodes in a multi-node system (i.e., multi-root complexes) that integrates PCIe interconnect technology. Moreover, the present disclosure does not require any change to conventional SR-IOV devices.

The present disclosure exploits the architectural features provided in a SR-IOV device to enable the device to be shared among virtual machines (e.g., system images) running under a single server to extend its sharing with multiple compute nodes (e.g., servers). By way of a PCIe manager and physical function driver(s), a management node within an intelligent network fabric enumerates the SR-IOV device and programs and maps all relevant resources under its own address range. The management node gathers all required and relevant statistics about the SR-IOV devices and makes it available to other nodes during the "Node and Resource Discovery" step of a device initialization process. Advantageously, the present disclosure provides a manner to assign a SR-IOV device's virtual functions to each of the designated compute nodes such that the compute nodes discover its assigned virtual functions as locally-connected physical endpoints (e.g., for storage, networking, etcetera).

Figure 6:
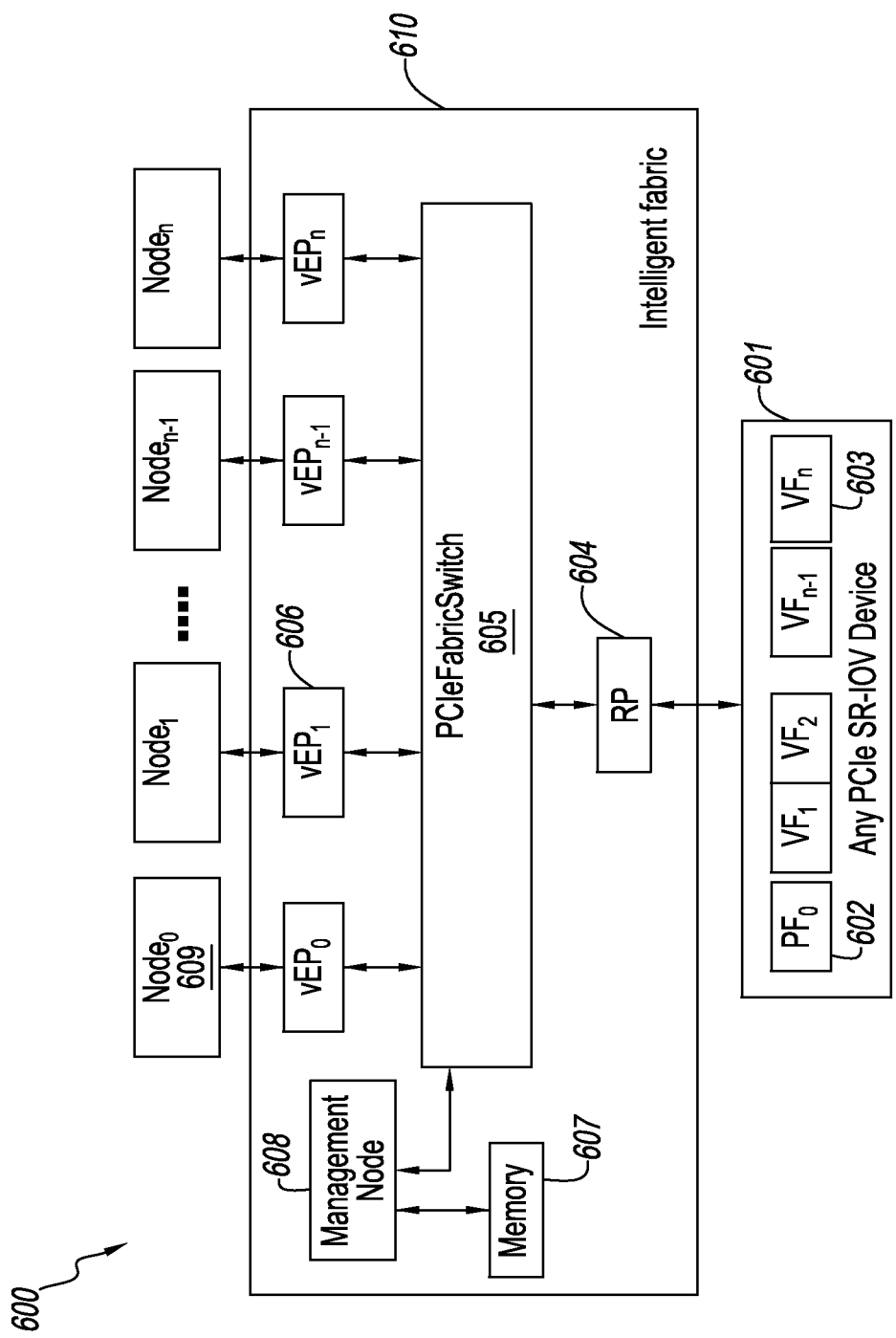
FIG. 6 is a schematic layout of a multi-node system with a SR-IOV device coupled to an intelligent network fabric consistent with the present disclosure.

FIG. 6 is a schematic layout of a multi-node system 600 with a SR-IOV device 601 coupled to an intelligent network fabric consistent with the present disclosure and illustrates a manner of how a SR-IOV device 601 is shared within the multi-node system 600. Multi-node system 600 includes a plurality of compute nodes 609 coupled to an intelligent network fabric 610. In some embodiments, the compute nodes 609 are root complexes and may be implemented as computer servers. The present disclosure does not preclude peer access between the compute nodes 609 and therefore the multi-node system described in this disclosure may be adaptable thereto.

Intelligent network fabric 610 includes one or more PCIe fabric switches 605. For example, multi-node system 600 includes six PCIe fabric/switch 605 which can provide a three-dimensional network topology. However, the present disclosure is not limited thereto. In some embodiments, a point-to-point topology is implemented wherein each north PCIe interface is connected to a compute node 609. In some embodiments, PCIe fabric/switch 605 includes an Intel On-Chip System Fabric (IOSF).

Intelligent network fabric 610 further includes a management node 608 which controls the SR-IOV device 601. In some embodiments, management node 608 may be external to the intelligent network fabric 610. Management node 608 controls SR-IOV device 601 in a similar manner that a hypervisor controls a conventional virtualized single-node system. Management node 608 may include logic to discover the compute nodes 609 and logic to discover (e.g., detect) and configure SR-IOV device 601. Intelligent network fabric 610 may also include local memory and a memory component 607 coupled thereto.

Particularly, management node 608 controls the physical function (PF) 602 of the SR-IOV device 601 via a physical function driver and assigns a virtual function (VF) 603 to each compute node 609. Accordingly, management node 608 runs the PF driver and each compute node 609 runs a copy of the corresponding VF driver. In some embodiments, the PF driver is resident within the management node 608 whereas a copy of the VF driver is resident within each compute node 609. Advantageously, this direct assignment of SR-IOV device 601 resources to various compute nodes 609 allows efficient utilization of the available I/O bandwidth with negligible, if any, impact to system performance.

Moreover, one or more of the VFs 603 is connected to management node 608 through its south PCIe interfaces (e.g., root port 604) and are assigned to compute nodes 609 on a 1:1 or many:1 basis through the virtual endpoints (vEP)

606. In some embodiments, the assignment of VFs 603 to the compute nodes 609 is performed in two steps—1) assign a VF 603 to a vEP 606 and 2) subsequently assign the vEP 606 to a compute node 609. Advantageously, the present disclosure makes use of all information acquired during the "Node and Resource Discovery" phase for any implemented network topology to effect the assignments.

Management node 608 has its own address domain. Additionally, compute nodes 609 also have their own address domain. However, in some implementations, each VF 603 connected to management node 608 is mapped into its address domain. In addition, management node 608 may serve as an intersection point for the address domain of each compute node 609 that shares resources with the SR-IOV device 601.

Virtual endpoint devices 606 may implement a set of translation registers to map relevant address and identification for transactions that are sent to and from management node 608 and compute nodes 609 via the intelligent fabric 610. Additionally, each virtual endpoint device 606 may implement a set of PCIe protocol-defined registers for transaction control, interrupt, power management, and error handling so as to enable it to proxy the assigned virtual function to the compute node 609 connected to it. In some implementations, the registers needed to properly enable the link between the virtual endpoint device 606 and the compute node 610 may 1) reside in each virtual endpoint device 606 2) reside in the assigned PF 602/VF 603 and 3) reside in both the virtual endpoint device 606 ad PF 602/VF 603. The virtual endpoint devices 606 include logic to connect with the compute nodes 609.

It should be understood by one having ordinary skill in the art that within this disclosure, a compute node 609 may be understood as a single root complex which includes one or more CPUs with associated memory, PCIe ports, and other interconnects and/or bridging functions. In addition, compute node 609 may include BIOS firmware and a manner to access a network and storage. A management node 608 may be understood as a type of compute node 609 but additionally provides hardware and software control to share the SR-IOV device 601 connected within the management node's 608 hierarchy.

Moreover, a PF 602 may be understood as a PCI function that contains a SR-IOV capability structure whereas a VF 603 may be understood as a function that is associated with a PF 602 which shares one or more physical resources.

Figure 7:
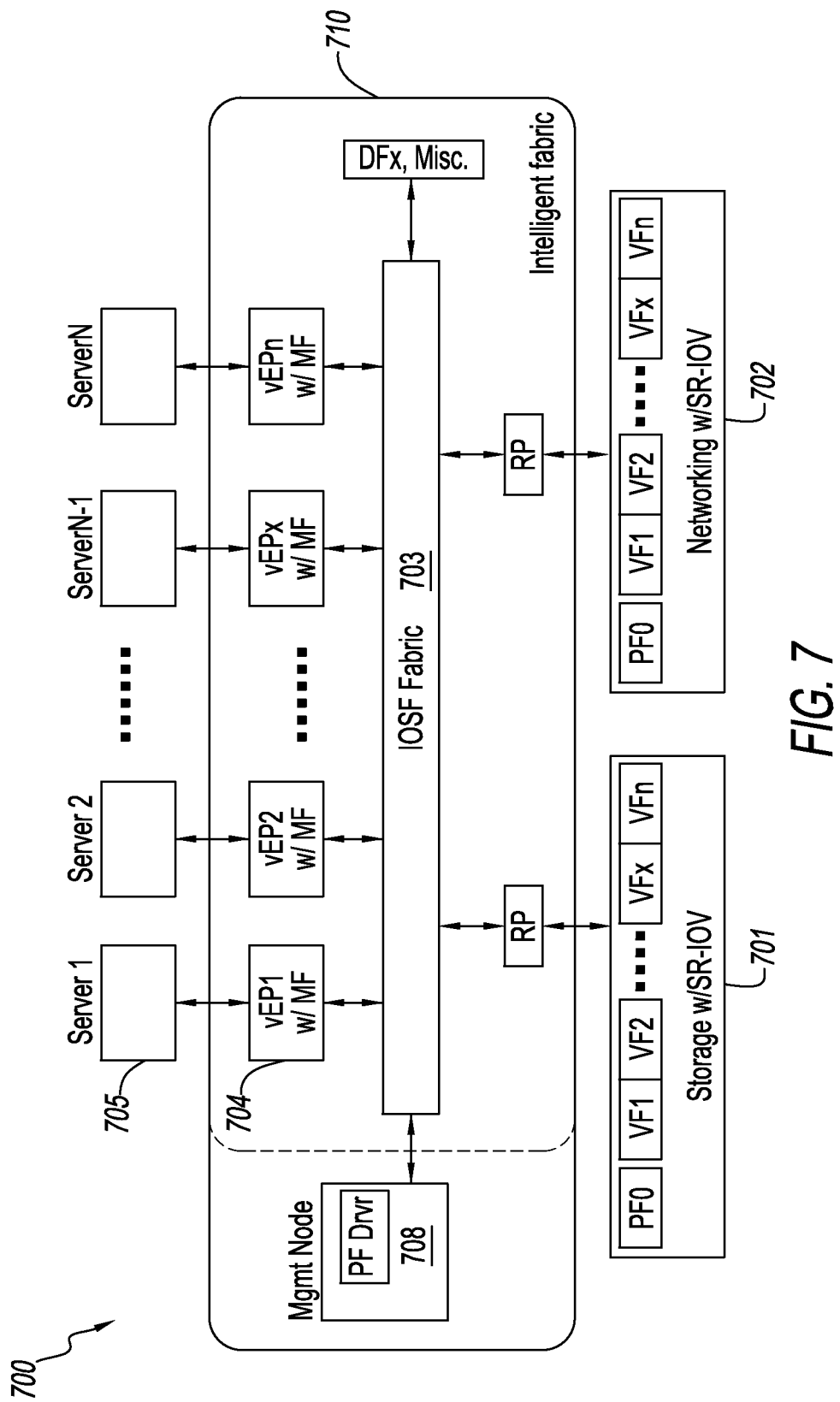
FIG. 7 is a schematic layout of a multi-node system with a set of non-virtualized physical servers having access to various virtual functions within two SR-IOV devices via an intelligent network fabric consistent with the present disclosure.

FIG. 7 is a schematic layout of a multi-node system 700 with a set of non-virtualized physical servers 705 having access to various virtual functions within two SR-IOV devices 701, 702 via an intelligent network fabric 710. Intelligent network fabric 710 includes a network fabric 703 (e.g., IOSF fabric 703) coupled to physical servers 705 via a plurality of virtual endpoint devices (vEP) 704. Furthermore, multi-node system 700 includes a management node 708 which includes logic to discover compute nodes 705 and logic to discover and configure SR-IOV devices 701, 702.

In some embodiments, each virtual endpoint device 704 is multi-functional (w/MF). Accordingly, management node 708 includes logic to assign two or more virtual functions (of SR-IOV 701, 702) to a single, virtual endpoint device 704. SR-IOV device 701 may be implemented as a storage device whereas SR-IOV device 702 may be implemented as a networking device. As such, each server 705 may have access to two or more virtual functions.

Figure 8:
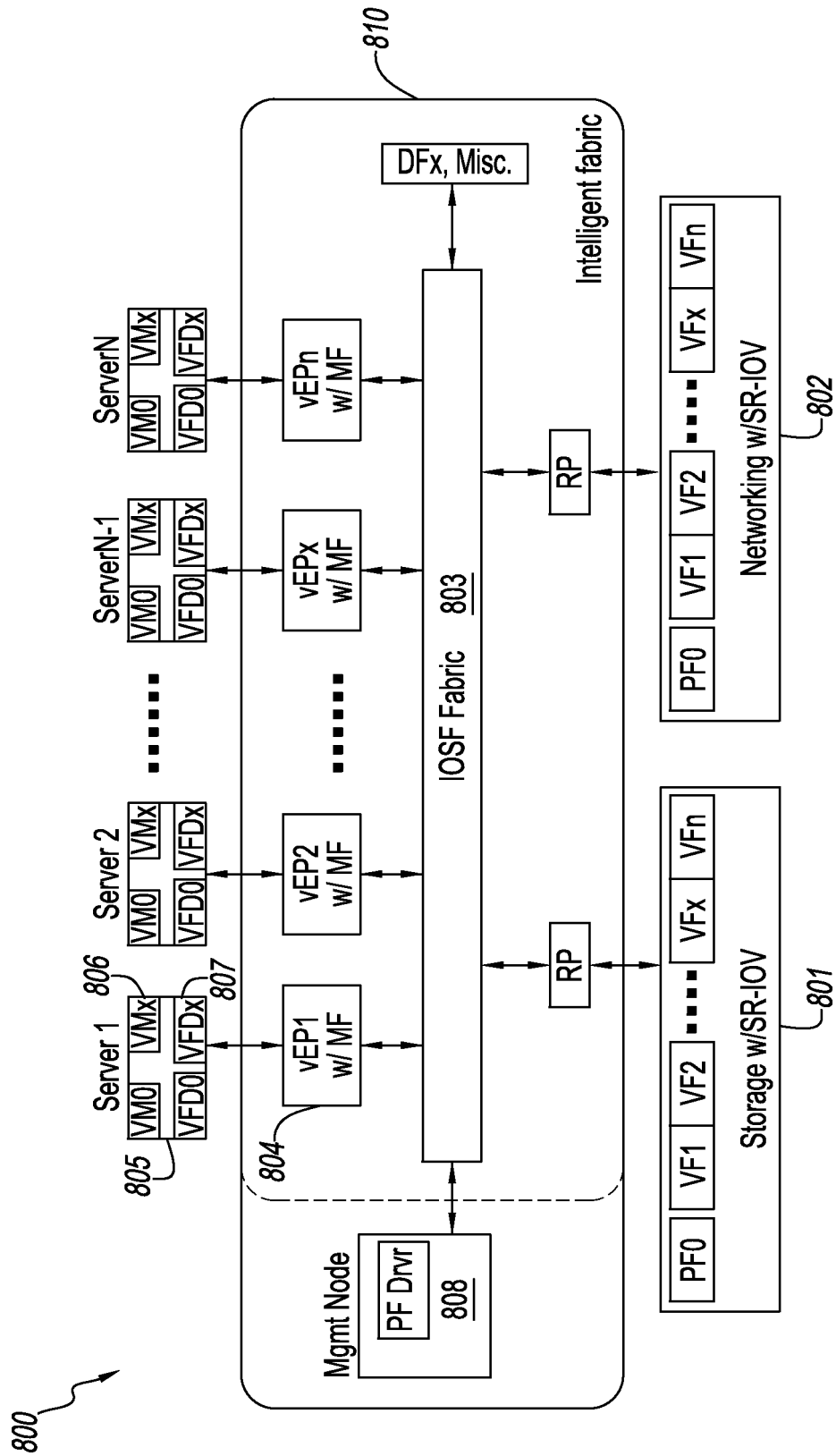
FIG. 8 is a schematic layout of a multi-node system with a set of virtualized servers coupled to a plurality of SR-IOV devices via an intelligent network fabric consistent with present disclosure.

FIG. 8 is a schematic layout of a multi-node system 800 with a set of virtualized servers 805 with a plurality of SR-IOV devices 801, 802 via an intelligent network fabric 810. Notably, each server 805 includes two or more virtual machine servers (e.g., $VM_X$) 806 each having an associated virtual function driver 807 (e.g., $VFD_X$). Intelligent network fabric 810 includes a network fabric (e.g., IOSF network fabric 803) coupled to the physical servers 805 via a plurality of endpoint devices (vEP) 804 with multi-function capability. Management node 808 includes logic to discover the compute nodes 805 and logic to discover and configure the SR-IOV devices 801, 802.

In some implementations, management node 808 assigns a virtual function to each virtual machine server 806. For example, virtualized servers 805 may have four virtual machine servers 806 associated therewith whereas the virtual endpoint devices 804 are multi-functional and have access to four virtual functions as assigned by the management node 808. As such, management node 808 may assign a unique virtual function to each one of the four virtual machine servers 806.

Figure 9:
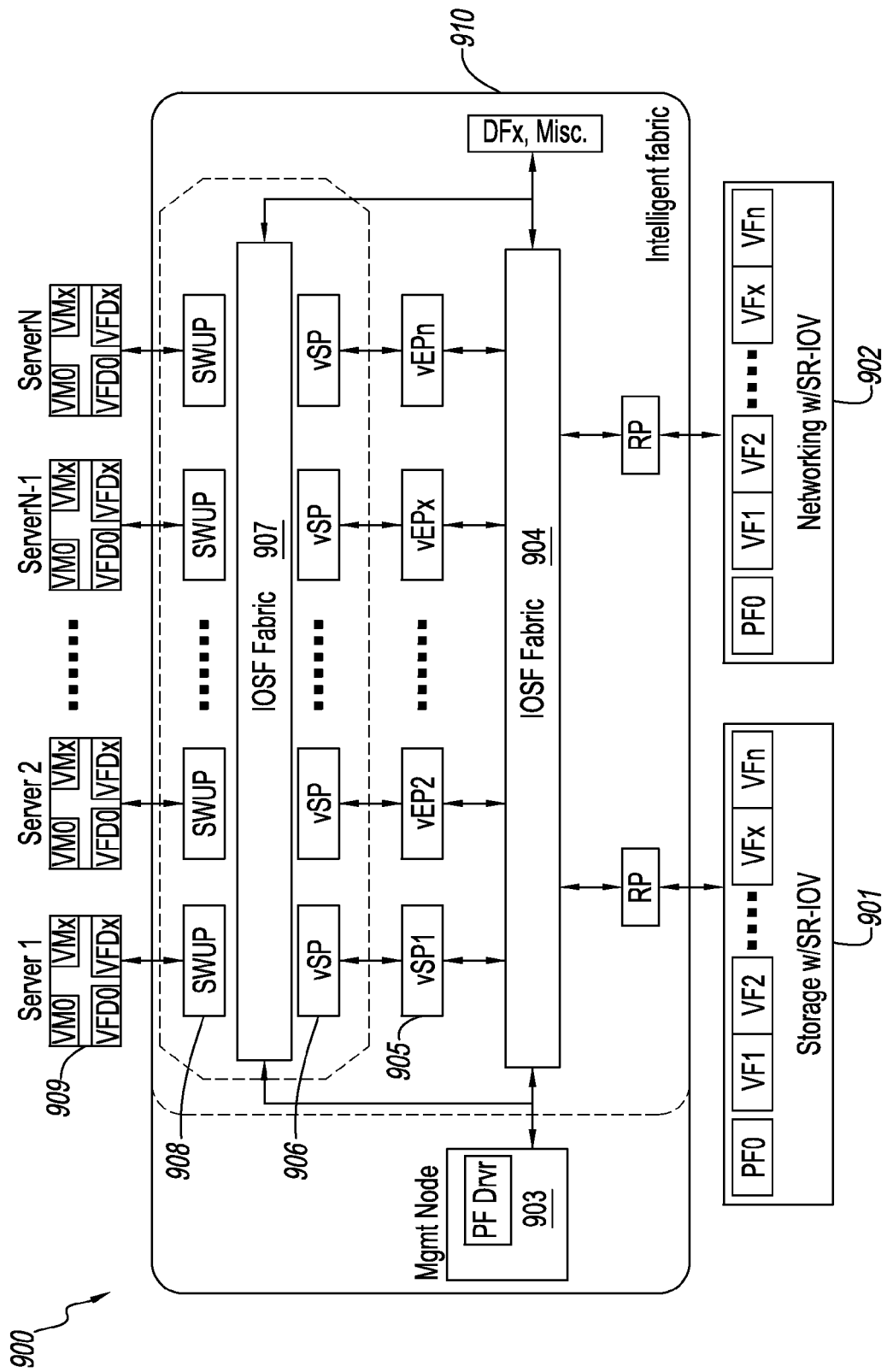
FIG. 9 is a schematic layout of yet another multi-node system with a set of virtualized servers coupled to a plurality of SR-IOV devices via an intelligent network fabric consistent with the present disclosure.

FIG. 9 is a schematic layout of yet another multi-node system 900 with a set of virtualized servers 909 with a plurality of SR-IOV devices 901, 902 via an intelligent network fabric 910. Multi-node system 900 includes a first SR-IOV device 901 and a second SR-IOV device 902 both having a physical function and a plurality of virtual functions. First SR-IOV device 901 and second SR-IOV device 902 are coupled to first network fabric (e.g., IOSF fabric) 904.

Intelligent network fabric 910 includes a plurality of virtual endpoint devices coupled to the first network fabric 904 and a second network fabric 907. The second network fabric 907 is coupled to a plurality of virtual servers 909 as shown.

A plurality of upstream switch ports (SWUP) 908 (PCIe defined) are coupled between the second network fabric 907 and the plurality of virtual servers 909. A plurality of virtual switch downstream ports (vSP) 906 are also coupled between second network fabric 907 and the plurality of virtual endpoint devices 905.

Intelligent network fabric 910 allows the virtual machine servers to be dynamically assigned a plurality of virtual functions. In some implementations, management node 903 dynamically assigns virtualized servers 909 to any one of the virtual endpoint devices 905. Advantageously, each virtual endpoint device 905 may be associated with one or more virtual functions within SR-IOV device 901 and/or SR-IOV device 902.

Figure 10:
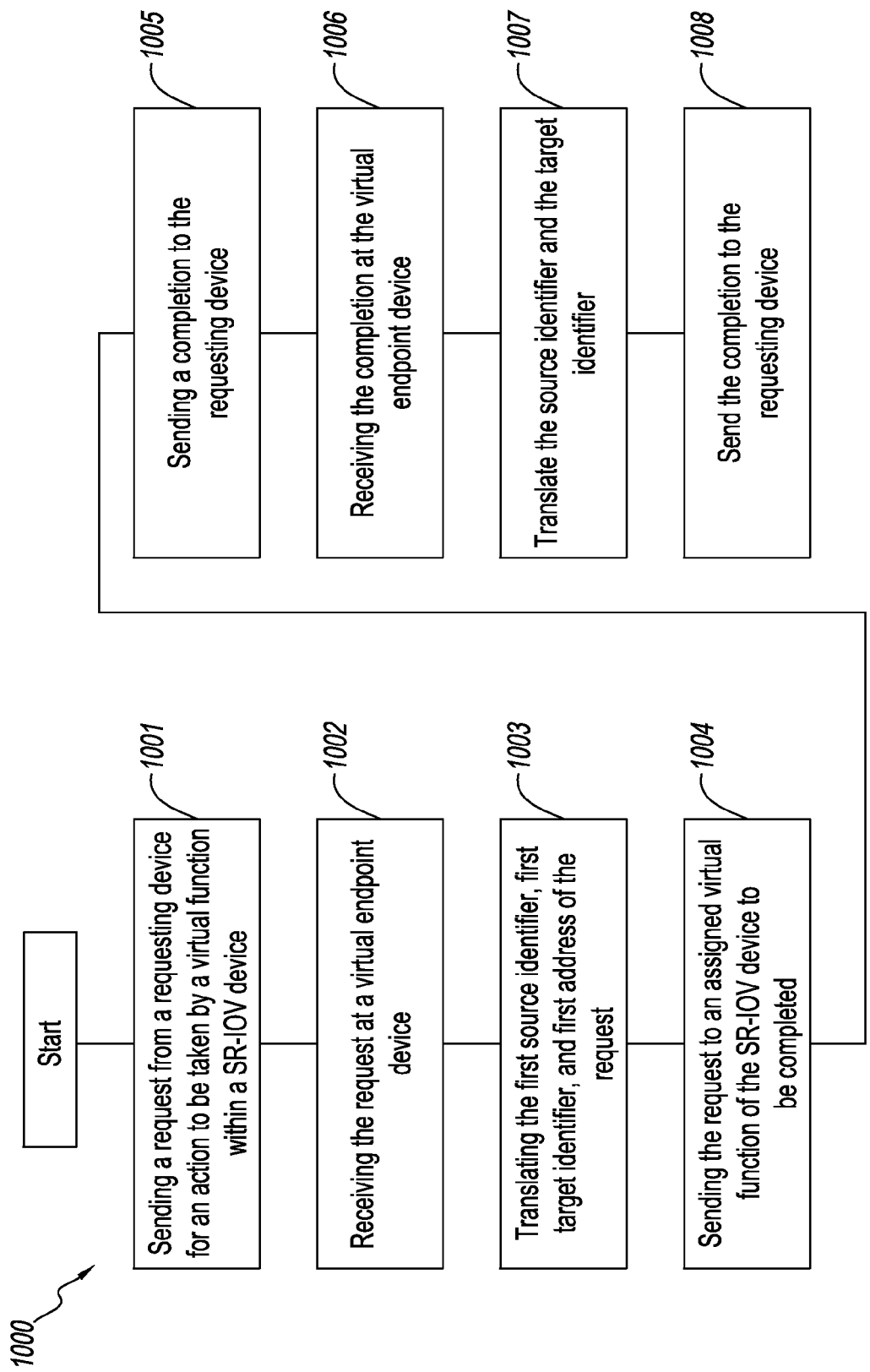
FIG. 10 is a flowchart of a method consistent with the present disclosure.

FIG. 10 is a flowchart 1000 of a method consistent with the present disclosure. Flowchart 1000 may describe a method for requesting action to a virtual function of a SR-IOV device from a compute node via an intelligent network fabric described herein. Flowchart 1000 begins with block 1001—sending a request from a requesting device (i.e., compute node) for an action to be taken by a virtual function with a SR-IOV device. In some embodiments, the request includes a source identifier, target identifier, completion identifier, and an address. The source identifier may include the requesting device's identifier (e.g., BDF) whereas the first target identifier may include the requesting device's identifier for its associated virtual endpoint device.

Next, receiving the request at a virtual endpoint device (block 1002). Once the request is received at the virtual endpoint device, the source identifier, first target identifier, and the address of the requester is translated (block 1003). Translation may include replacing the source identifier with the identifier of the virtual endpoint device, replacing the target identifier with that of the virtual function which has been assigned to the server (or virtual machine server) by the management node, and replacing the address with that of the assigned virtual function.

Next, sending the request to the assigned virtual function of a SR-IOV device to be completed (block 1004). Once the assigned virtual function completes the request, the virtual function sends the completion back to the requesting device (block 1005). In some embodiments, the completion includes the data requested, a source identifier, target identifier, and completion identifier.

In time, the completion is received at the virtual endpoint device (block 1006). Once the completion is received, the source identifier and target identifier are translated (block 1007). In some embodiments, the source identifier is replaced with the server identifier (e.g., server BDF) and the target identifier is replaced with the identifier that the server associates with the virtual endpoint device. Lastly, the completion is sent to the requesting device (block 1008).

In the method described, the management node of each domain controls the SR-IOV device and assigns a BDF and address map to the PF and VFs compliant with its own system mapping. Additionally, each node discovers a virtual endpoint device with its BDF identifier and address space compliant with its own system mapping. The management node assigns the virtual functions to the nodes that are in need of resources. Each node sees the assigned virtual function as a locally-connected PCIe virtual endpoint device.

In some embodiments, the virtual endpoint device's associated BDF and address is translated into its assigned virtual function's BDF and address space for the following access from the node:
  Enumeration/Configuration (Target ID translated)
  MMIO/Memory Addressing (Address translated)
  Completions (Completer ID translated)

Additionally, the virtual function's BDF is translated into its corresponding virtual endpoint device's BDF for the following access from the device:
  Enumeration/Configuration (no translation as device is setup with vEP system map, Requester ID translated)
  Completions (Requester ID translated).

Moreover, DMA transfer from the virtual functions do not require address translation as the DMA transfer happens in the native address domain of the node that the virtual function is assigned to. At most, identifier (ID) translation may occur but not address translation.

In some implementations, the number of virtual endpoints may bound the number of nodes that may share the SR-IOV device. In addition, the number of virtual functions may bound the number of nodes that may share the SR-IOV device. The virtual endpoint devices may implement relevant registers to enable sharing of the virtual functions in the SR-IOV device such as, but not limited to, address translation control registers, memory BARs analogous to those assigned to the virtual function, and PF shadow registers.

The SR-IOV specification provides that both physical function and each virtual function implement unique interrupt capabilities. The physical function may implement INTx and MSI/MSI-X. Each virtual function is only allowed to implement MSI/MSI-X. The interrupts received from physical functions are consumed by the intelligent fabric and routed to the management node. Notably, the interrupts received from the virtual functions are routed to their corresponding compute node through the corresponding virtual endpoint device. The fabric properly routes the MSI/MSI-X interrupts to the management node or compute node through its corresponding virtual endpoint device based on the requester identifier.

The compute node interface through a virtual endpoint device supports independent power management capabilities. As such, the virtual endpoint device implements the PCIe specification compliant-power management capabilities registers. Each virtual endpoint device to compute node link supports all Active State Power Management states (L0, L1), PCI-PM power management states (L1, L2/L3) independent of all other virtual endpoint device to compute node link, and any downstream interface power states of the intelligent fabric.

Power management of the virtual endpoint device is mostly controlled by the state of the connected compute node. The management node of the intelligent fabric controls the power management state of the root ports and the SR-IOV devices. The level and extent of the power management state transitioned by root ports and SR-IOV devices are dependent on the power state of the compute node interfaces. The root ports and SR-IOV devices may only transition to a low power state in the event that the associated compute node interfaces are at equivalent or lower power states.

The PCIe specification defines two levels of error capabilities—Baseline Error Reporting capabilities and Advanced Error Reporting (AER) capabilities. In some implementations, the control bits for baseline error reside in the physical function for a SR-IOV device. Each virtual function has independent status bits. In addition, in some embodiments, each physical or virtual function that generate error messages must generate it with its own routing identifier. The advanced error-reporting capability supports two types of errors—correctable and uncorrectable. Each function implements its own status register to log the AER errors. The control bits for AER errors may reside in the physical function of the SR-IOV device. The baseline and advanced errors are further categorized based on its reporting mechanism and are typically function-specific or non-function-specific errors.

Function-specific errors may be distinctly detected and reported by a PF or VF function whereas non-function-specific errors may not be distinctly detected or reported by a PF or VF function. The non-function-specific errors are primarily reported by the physical function of the SR-IOV device.

Errors may be detected and logged in their corresponding status registers and flagged properly. For example, PCIe-specification defined errors detected in the virtual endpoint devices may lead to the generation of error messages by the vEP and sent to the connected compute node. Errors related to the intelligent fabric are reported to the management node which determines which of these errors will be escalated to one of the compute nodes.

In addition, the SR-IOV device will generate error messages with the physical function requester identifier for all non-function specific errors. For all function-specific errors, the SR-IOV device will generate error messages with corresponding virtual requester identification. These error messages are routed directly to the compute node, through its corresponding virtual endpoint device, to which the virtual function is assigned.

The present disclosure provides an intelligent network fabric used to connect multiple computer nodes with one or more SR-IOV devices. It will be understood by those having ordinary skill in the art that the present disclosure may be embodied in other specific forms without departing from the spirit and scope of the disclosure disclosed. In addition, the examples and embodiments described herein are in all respects illustrative and not restrictive. Those skilled in the art of the present disclosure will recognize that other embodiments using the concepts described herein are also possible.

The invention claimed is:

1. An intelligent network fabric, comprising:
a plurality of fabric switches coupled to a management node;
a plurality of virtual endpoint devices to couple the plurality of fabric switches to a plurality of compute nodes external to the intelligent network fabric; and
a root port device coupled to the plurality of fabric switches, the root port device to connect with virtual functions within a PCIe single root input/output (I/O) virtualization (SR-IOV) device external to the intelligent network fabric,
wherein the SR-IOV device is shared among the plurality of compute nodes through the plurality of virtual endpoint devices, the plurality of fabric switches, and the root port device.

2. The intelligent network fabric of claim 1, wherein at least one of the plurality of virtual endpoint devices are assigned two or more virtual functions of the SR-IOV device.

3. The intelligent network fabric of claim 1, wherein the management node includes a physical function driver to discover and configure the virtual functions within the SR-IOV device.

4. The intelligent network fabric of claim 1, wherein the plurality of fabric switches includes a PCIe fabric switch.

5. The intelligent network fabric of claim 1, further comprising memory.

6. The intelligent network fabric of claim 1, further comprising the management node.

7. A system, comprising:
an intelligent network fabric, comprising:
a management node coupled to a plurality of fabric switches, wherein the management node includes logic to assign a virtual function to each of a plurality of virtual endpoint devices;
a first SR-IOV device coupled to the plurality of fabric switches, the first SR-IOV device to include a physical function and a plurality of virtual functions wherein each virtual function is assigned to at least one of the plurality of virtual endpoint devices; and
a plurality of compute nodes coupled to the plurality of virtual endpoint devices via the plurality of fabric switches, wherein the first SR-IOV device is shared among the plurality of compute nodes through the plurality of virtual endpoint devices and the plurality of fabric switches.

8. The system of claim 7, further comprising a root port coupled to a first plurality of network switches and the first SR-IOV device.

9. The system of claim 7, wherein each virtual endpoint device is multi-functional.

10. The system of claim 9, wherein the management node includes logic to assign two or more of the virtual functions to a single virtual endpoint device.

11. The system of claim 10, wherein at least one of the compute nodes is virtualized and has a plurality of virtual machines and wherein each virtual machine is assigned a unique virtual function.

12. The system of claim 7, further comprising a memory component coupled to the management node.

13. The system of claim 7, wherein the first plurality of fabric switches includes an Intel™ On-Chip System Fabric (IOSF).

14. The system of claim 7, wherein the first plurality of fabric switches includes a PCIe fabric.

15. The system of claim 7, wherein each of the plurality of compute nodes are computer servers.

16. The system of claim 7, wherein at least one of the compute nodes includes a plurality of virtual servers.

17. The system of claim 7, further comprising a second SR-IOV device, the second SR-IOV device to include a plurality of virtual functions.

18. The system of claim 7, wherein each compute node includes an operating system, BIOS, local memory, access to storage, and an access to a network.

19. A multi-node system, comprising:
a first SR-IOV device having a first physical function and a first plurality of virtual functions;
a second SR-IOV device having a second physical function and a second plurality of virtual functions;
wherein the first SR-IOV device and the second SR-IOV device are coupled to a first plurality of fabric switches;
a plurality of virtual endpoint devices coupled to the first plurality of fabric switches and to a second plurality of fabric switches; and
a plurality of virtual servers coupled to the second SR-IOV device wherein the SR-IOV devices are shared among a plurality of compute nodes through the plurality of virtual endpoint devices and the plurality of fabric switches.

20. The multi-node system of claim 19, further comprising a plurality of switch upstream ports coupled between the second plurality of fabric switches and the plurality of virtual servers.

21. The multi-node system of claim 19, further comprising a first root port coupled between the first plurality of fabric switches and the first SR-IOV device and a second root port coupled between the first plurality of fabric switches and the second SR-IOV device.

22. The multi-node system of claim 19, further comprising a plurality of virtual switch downstream ports coupled between the second plurality of fabric switches and the plurality of virtual endpoint devices.

23. The multi-node system of claim 19, further comprising a management node to include a physical function driver for both the first physical function of the first SR-IOV device and the second physical function of the second SR-IOV device.

24. The multi-node system of claim 19, wherein each virtual server includes at least four virtual server machines.

25. The multi-node system of claim 19, wherein the first SR-IOV device is a storage device and the second SR-IOV device is a networking device.

26. A computer readable medium including code, when executed, to cause a machine to:
send a request from a requesting device for an action to be taken by a virtual function within an SR-IOV device, the request including a first source identifier, first target identifier, completion identifier, and a first address;
receive the request at a virtual endpoint device coupled within a plurality of fabric switches;
translate the first source identifier, first target identifier, and first address of the request;
and
send the request to an assigned virtual function within the SR-IOV device to be completed, wherein the SR-IOV device is shared among a plurality of compute nodes through a plurality of virtual endpoint devices and the plurality of fabric switches.

27. The computer readable medium of claim 26, wherein the first source identifier is translated to an identifier of the virtual endpoint device, the first target identifier is translated to an identifier of a virtual function of the SR-IOV device, and the first address is translated to an address of the virtual function.

28. The computer readable medium of claim 26, wherein the requesting device is a computer server.

29. The computer readable medium of claim 26, further including code, when executed, to cause a machine to:
 send a completion to the requesting device, the completion including a second source identifier, second target identifier, and a completion identifier;
 receive the completion at the virtual endpoint device;
 translate the second source identifier and the second target identifier; and
 send the completion to the requesting device.

30. The computer readable medium of claim 29, wherein the second source identifier is translated to an identifier of the requesting device and the second target identifier is translated to an identifier of the virtual endpoint device.

31. The computer readable medium of claim 29, wherein the completion includes data that is requested from the requesting device.

\* \* \* \* \*